(12) United States Patent  
Schibur et al.

(10) Patent No.: US 9,469,745 B2
(45) Date of Patent: Oct. 18, 2016

(54) ENGINEERED COMPOSITE MATERIAL AND PRODUCTS PRODUCED THEREFROM

(71) Applicant: Kohler Co., Kohler, WI (US)

(72) Inventors: Mark W. Schibur, Sheboygan, WI (US); John A. Teubert, Madison, AL (US)

(73) Assignee: KOHLER CO, Kohler, WI (US)

( * ) Notice: Subject to any disclaimer, the term of this patent is extended or adjusted under 35 U.S.C. 154(b) by 210 days.

(21) Appl. No.: 14/062,758

(22) Filed: Oct. 24, 2013

(65) Prior Publication Data

US 2014/0121301 A1    May 1, 2014

Related U.S. Application Data

(60) Provisional application No. 61/718,514, filed on Oct. 25, 2012.

(51) Int. Cl.

| | |
|---|---|
| C08K 3/36 | (2006.01) |
| B29C 70/58 | (2006.01) |
| C08K 3/22 | (2006.01) |
| A47K 1/04 | (2006.01) |
| C04B 26/02 | (2006.01) |
| A47K 3/02 | (2006.01) |
| A47K 3/40 | (2006.01) |
| C04B 111/27 | (2006.01) |
| C04B 111/54 | (2006.01) |
| E03C 1/14 | (2006.01) |

(52) U.S. Cl.
CPC . *C08K 3/36* (2013.01); *A47K 1/04* (2013.01); *A47K 3/02* (2013.01); *A47K 3/40* (2013.01); *B29C 70/58* (2013.01); *C04B 26/02* (2013.01); *C08K 3/22* (2013.01); *C04B 2111/27* (2013.01); *C04B 2111/54* (2013.01); *E03C 1/14* (2013.01); *Y02W 30/95* (2015.05)

(58) Field of Classification Search
CPC .................................. C04B 26/02; C08K 3/36
See application file for complete search history.

(56) References Cited

U.S. PATENT DOCUMENTS

| | | |
|---|---|---|
| 3,673,617 A | 7/1972 | Schulz, Jr. |
| 4,126,719 A | 11/1978 | Koyanagi et al. |
| 4,130,536 A | 12/1978 | Reighter |
| 4,374,695 A | 2/1983 | Ikeda et al. |
| 5,064,585 A | 11/1991 | Cooper et al. |

(Continued)

FOREIGN PATENT DOCUMENTS

| | | |
|---|---|---|
| CH | 62999 | 5/1982 |
| CN | 101054306 A | 10/2007 |

(Continued)

OTHER PUBLICATIONS

Chinese Office Action regarding Application No. 201380003756.5 dated Nov. 11, 2015, 10 pages.

(Continued)

*Primary Examiner* — Megan McCulley
(74) *Attorney, Agent, or Firm* — Foley & Lardner LLP (57) ABSTRACT

A composite material includes a polymer matrix material and filler material that includes vitreous china. The composite material has a water absorption of less than about one percent. Such a composite material may be used in the production of articles such as sinks, bathtubs, shower receptors, and other articles that may benefit from low water absorption properties.

20 Claims, 8 Drawing Sheets

(56) References Cited

U.S. PATENT DOCUMENTS

| | | | |
|---|---|---|---|
| 5,110,413 A | 5/1992 | Steer | |
| 5,173,960 A * | 12/1992 | Dickinson | G02B 6/4403 |
| | | | 174/121 A |
| 5,218,013 A | 6/1993 | Schock | |
| 5,229,439 A | 7/1993 | Gueret | |
| 5,244,941 A | 9/1993 | Bruckbauer et al. | |
| 5,266,366 A | 11/1993 | Hanneman | |
| 5,269,991 A | 12/1993 | Gueret | |
| 5,275,852 A | 1/1994 | Jones et al. | |
| 5,280,051 A | 1/1994 | Traverso et al. | |
| 5,356,953 A | 10/1994 | Harada et al. | |
| 5,364,672 A | 11/1994 | Schultze-Kraft | |
| 5,368,791 A | 11/1994 | Uchida et al. | |
| 5,372,976 A * | 12/1994 | Matsumoto | C03C 8/14 |
| | | | 501/144 |
| 5,376,321 A | 12/1994 | Uchida et al. | |
| 5,407,988 A | 4/1995 | Kogowski | |
| 5,422,391 A | 6/1995 | Inoue | |
| 5,445,772 A | 8/1995 | Uchida et al. | |
| 5,451,362 A | 9/1995 | Wombwell et al. | |
| 5,451,620 A | 9/1995 | Cepeda-Guerra | |
| 5,459,179 A | 10/1995 | Asanaka et al. | |
| 5,505,895 A | 4/1996 | Bull et al. | |
| 5,523,044 A | 6/1996 | Wombwell et al. | |
| 5,543,100 A | 8/1996 | Klüh et al. | |
| 5,580,621 A | 12/1996 | Kuszaj et al. | |
| 5,588,599 A | 12/1996 | Novak | |
| 5,616,633 A | 4/1997 | Wombwell et al. | |
| 5,634,307 A | 6/1997 | Larriberot et al. | |
| 5,676,895 A | 10/1997 | Toivola et al. | |
| 5,708,066 A | 1/1998 | Otremba et al. | |
| 5,717,008 A | 2/1998 | Galano | |
| 5,787,667 A | 8/1998 | Sheahan et al. | |
| 5,877,246 A | 3/1999 | Leverrier | |
| 5,882,560 A | 3/1999 | Ittmann et al. | |
| 5,900,204 A | 5/1999 | Wombwell et al. | |
| 5,906,784 A | 5/1999 | Weidmann | |
| 5,947,274 A | 9/1999 | Taskis et al. | |
| 6,015,519 A | 1/2000 | Lapikas et al. | |
| 6,028,127 A | 2/2000 | Yanagase et al. | |
| 6,054,080 A | 4/2000 | Sheahan et al. | |
| 6,083,339 A | 7/2000 | Peters et al. | |
| 6,118,096 A | 9/2000 | Feng et al. | |
| 6,127,458 A | 10/2000 | Sakai | |
| 6,136,226 A | 10/2000 | Sakai | |
| 6,146,548 A | 11/2000 | Sakai | |
| 6,168,853 B1 | 1/2001 | Feng et al. | |
| 6,174,954 B1 | 1/2001 | Amekawa | |
| 6,177,179 B1 | 1/2001 | Schock et al. | |
| 6,221,300 B1 | 4/2001 | Sakai | |
| 6,235,367 B1 | 5/2001 | Holmes | |
| 6,265,467 B1 | 7/2001 | Koyanagi et al. | |
| 6,274,080 B1 | 8/2001 | Tang et al. | |
| 6,309,562 B1 | 10/2001 | Sakai et al. | |
| 6,316,548 B1 | 11/2001 | Koyanagi et al. | |
| 6,323,259 B1 | 11/2001 | Ikegami et al. | |
| 6,365,662 B1 | 4/2002 | Sakai et al. | |
| 6,375,864 B1 | 4/2002 | Phillips et al. | |
| 6,391,979 B1 | 5/2002 | Keehan | |
| 6,451,910 B1 | 9/2002 | Koyanagi et al. | |
| 6,500,543 B2 | 12/2002 | Sakai | |
| 6,511,750 B1 | 1/2003 | Yanagase et al. | |
| 6,548,157 B2 | 4/2003 | Ghahary | |
| 6,623,813 B2 | 9/2003 | Hsu | |
| 6,627,315 B2 | 9/2003 | Sakai | |
| 6,632,527 B1 * | 10/2003 | McDaniel | B01J 2/20 |
| | | | 166/295 |
| 6,726,864 B2 | 4/2004 | Nasr et al. | |
| 6,726,970 B2 | 4/2004 | Schoela et al. | |
| 6,747,075 B2 | 6/2004 | Nardi et al. | |
| 6,786,964 B2 | 9/2004 | Onishi et al. | |
| 6,787,579 B2 | 9/2004 | Czaplicki et al. | |
| 6,857,141 B1 | 2/2005 | Jackson et al. | |
| 6,866,914 B2 | 3/2005 | Yamanashi et al. | |
| 6,869,985 B2 | 3/2005 | Mohanty et al. | |
| 6,936,643 B1 | 8/2005 | Joussen et al. | |
| 7,175,790 B2 | 2/2007 | Emadipour et al. | |
| 7,241,410 B2 | 7/2007 | Stiattesi | |
| 7,244,778 B2 | 7/2007 | Choate et al. | |
| 7,278,176 B2 | 10/2007 | Clarke | |
| 7,291,288 B2 | 11/2007 | Yamanashi et al. | |
| 7,368,152 B2 | 5/2008 | Sakai et al. | |
| 7,371,441 B2 | 5/2008 | Sakai et al. | |
| 7,396,567 B2 | 7/2008 | Howard | |
| 7,427,642 B2 | 9/2008 | Kwon | |
| 7,442,726 B2 | 10/2008 | Ghahary et al. | |
| 7,498,374 B2 | 3/2009 | Frank | |
| 7,566,492 B2 | 7/2009 | Park et al. | |
| 7,592,394 B2 | 9/2009 | Yang et al. | |
| 7,638,189 B2 | 12/2009 | Choi | |
| 7,648,747 B2 | 1/2010 | Straka et al. | |
| 7,662,870 B2 | 2/2010 | Park et al. | |
| 7,695,657 B2 | 4/2010 | Toncelli | |
| 7,749,418 B2 | 7/2010 | Kwon et al. | |
| 7,790,784 B2 | 9/2010 | Nasr et al. | |
| 7,838,102 B2 | 11/2010 | Phillips | |
| 7,875,668 B2 | 1/2011 | Chung et al. | |
| 7,892,464 B2 | 2/2011 | Toncelli | |
| 7,923,099 B2 | 4/2011 | Park et al. | |
| 7,959,991 B1 | 6/2011 | West | |
| 7,981,948 B2 | 7/2011 | Son et al. | |
| 8,017,051 B2 | 9/2011 | Choi et al. | |
| 8,034,446 B2 | 10/2011 | Juen et al. | |
| 8,039,539 B2 | 10/2011 | Pfeiffer et al. | |
| 8,048,934 B2 | 11/2011 | Jeon et al. | |
| 8,063,117 B2 | 11/2011 | Sung | |
| 8,088,489 B2 | 1/2012 | Oh | |
| 8,133,575 B2 | 3/2012 | Rha et al. | |
| 8,153,722 B2 | 4/2012 | Nagelsdiek et al. | |
| 8,181,288 B1 | 5/2012 | Davis, Jr. | |
| 2001/0051674 A1 | 12/2001 | Renzi et al. | |
| 2002/0028868 A1 | 3/2002 | Brasser et al. | |
| 2002/0048676 A1 * | 4/2002 | McDaniel | A63K 1/00 |
| | | | 428/404 |
| 2002/0100228 A1 * | 8/2002 | Yoder | B29C 47/0019 |
| | | | 52/80.1 |
| 2003/0006520 A1 | 1/2003 | Lin | |
| 2003/0124269 A1 | 7/2003 | Servi | |
| 2004/0258854 A1 | 12/2004 | Zhu | |
| 2005/0055931 A1 | 3/2005 | Rochette | |
| 2005/0058822 A1 | 3/2005 | Ittel | |
| 2005/0065260 A9 | 3/2005 | Kolarik | |
| 2005/0123694 A1 | 6/2005 | Simmons et al. | |
| 2005/0194141 A1 * | 9/2005 | Sinclair | C09K 8/805 |
| | | | 166/280.2 |
| 2005/0244600 A1 | 11/2005 | Wycech | |
| 2006/0026918 A1 | 2/2006 | Colombo et al. | |
| 2006/0036010 A1 | 2/2006 | Kim et al. | |
| 2006/0037267 A1 | 2/2006 | Taylor, Jr. et al. | |
| 2006/0121264 A1 | 6/2006 | Rha et al. | |
| 2006/0267230 A1 | 11/2006 | Rha et al. | |
| 2006/0270758 A1 | 11/2006 | Ong et al. | |
| 2007/0003791 A1 | 1/2007 | Rochette | |
| 2007/0224371 A1 | 9/2007 | Stiattesi | |
| 2007/0227087 A1 | 10/2007 | Nasr et al. | |
| 2008/0005988 A1 | 1/2008 | Dombowsky | |
| 2008/0006366 A1 | 1/2008 | Toncelli | |
| 2008/0090720 A1 * | 4/2008 | Warmerdam | C04B 33/13 |
| | | | 501/86 |
| 2008/0132607 A1 | 6/2008 | Reichenberger et al. | |
| 2008/0138650 A1 * | 6/2008 | Kato | B22C 1/00 |
| | | | 428/687 |
| 2008/0245269 A1 | 10/2008 | Forth et al. | |
| 2009/0062413 A1 | 3/2009 | Adur et al. | |
| 2009/0093568 A1 | 4/2009 | Lacock et al. | |
| 2009/0130377 A1 | 5/2009 | Samanta et al. | |
| 2009/0151884 A1 * | 6/2009 | Merriman | D21H 13/20 |
| | | | 162/145 |
| 2009/0163641 A1 | 6/2009 | Oliveira et al. | |
| 2009/0269516 A1 | 10/2009 | Chu | |
| 2009/0280313 A1 | 11/2009 | Song et al. | |
| 2010/0001622 A1 | 1/2010 | Dunbar | |
| 2010/0005733 A1 | 1/2010 | Anderson | |
| 2010/0063193 A1 | 3/2010 | Cruz | |

(56) References Cited

U.S. PATENT DOCUMENTS

| | | |
|---|---|---|
| 2010/0098489 A1 | 4/2010 | Pollack |
| 2010/0113645 A1 | 5/2010 | Oh et al. |
| 2010/0120964 A1 | 5/2010 | Sult |
| 2010/0129593 A1 | 5/2010 | Rempt et al. |
| 2010/0154676 A1 | 6/2010 | Park et al. |
| 2010/0192814 A1 | 8/2010 | Herzog et al. |
| 2010/0194005 A1 | 8/2010 | Toncelli |
| 2010/0209695 A1 | 8/2010 | Cho |
| 2010/0239847 A1 | 9/2010 | Darby et al. |
| 2010/0311867 A1 | 12/2010 | Kim |
| 2011/0030292 A1 | 2/2011 | Oram et al. |
| 2011/0111141 A1 | 5/2011 | Jeong et al. |
| 2011/0178228 A1 | 7/2011 | Kim |
| 2011/0185662 A1 | 8/2011 | Mollinger et al. |
| 2011/0207849 A1 | 8/2011 | Cruz |
| 2011/0262701 A1 | 10/2011 | Albertelli |
| 2011/0263783 A1 | 10/2011 | Son |
| 2011/0271876 A1 | 11/2011 | Alter et al. |
| 2011/0275737 A1 | 11/2011 | Kim et al. |
| 2011/0281087 A1 | 11/2011 | Sanchis Brines et al. |
| 2011/0281094 A1 | 11/2011 | Zanchetta et al. |
| 2011/0318515 A1 | 12/2011 | Dubois et al. |
| 2012/0055001 A1 | 3/2012 | Dunbar |

FOREIGN PATENT DOCUMENTS

| | | | |
|---|---|---|---|
| CN | 101445325 A | 6/2009 | |
| CN | 101844910 A | 9/2010 | |
| CN | 102249694 A | 11/2011 | |
| DE | 10145537 | 4/2003 | |
| EP | 0584977 | 3/1994 | |
| SU | 153766 | 1/1990 | |
| WO | WO 2014066693 A1 * | 5/2014 | ............... A47K 1/04 |

OTHER PUBLICATIONS

International Search Report in PCT Application No. PCT/US2013/066700 mailed Mar. 3, 2014.

\* cited by examiner

ENGINEERED COMPOSITE MATERIAL AND PRODUCTS PRODUCED THEREFROM

CROSS-REFERENCE TO RELATED APPLICATIONS

The present application claims the benefit of and priority to U.S. Provisional Patent Application No. 61/718,514, filed Oct. 25, 2012, the entire disclosure of which is incorporated herein by reference.

BACKGROUND

The present application relates to a material for use in the production of products that may benefit from having a hard, non-porous surface appearance and feel, and in particular may find utility in kitchen and bath products such as kitchen sinks, lavatory sinks, countertops, bathtubs, shower receptors, and the like. More particularly, the present disclosure relates to an engineered composite material for use in the production of such products.

In many applications, it is desirable to have a hard, generally non-porous surface. For example, consumers may prefer that kitchen countertops and the like have such a surface to resist staining and damage due to wear resulting from everyday use. Natural stone (e.g., granite, limestone, etc.) is often used in such applications, but is limited by various material properties. For example, stone may have a number of natural imperfections in the material, which can result in a brittle material prone to cracking or breaking during the manufacturing and installation processes. The brittleness of the material can result in chipping or cracking of the material upon impact (e.g. pans or dishes impacting a stone kitchen counter). Natural stone also typically has a relatively high porosity and water absorption, which from a practical standpoint means that such material must be frequently sealed, which results in significant additional maintenance cost and effort. Additionally, stone is an expensive material to use given the difficulty to machine the product, as well as its limited availability. Natural stone also has other limitations, including that the stone cannot be formed into complicated shapes easily without significant effort. For example, if it were desired to produce a sink made of a natural stone material, a relatively large amount of material would be wasted in the machining process, since the manufacture would start with a large piece of stone and a significant amount of the stone would be removed in the formation process to create the desired shape.

Given the numerous disadvantages of using natural stone in household applications, there exists a need for an engineered composite material that may be used in these applications and that has enhanced material properties that is intended to resist staining and to provide increased stain resistance, abrasion resistance, chemical resistance, and decreased brittleness. Such a material would ideally be relatively simple and efficient to produce and may incorporate materials that are readily available.

SUMMARY

An exemplary embodiment relates to a composite material that includes a polymer matrix material and filler material that includes vitreous china. The composite material has a water absorption of less than about one percent.

Another exemplary embodiment relates to an article comprising a composition, the composition comprising a polymer matrix material and a filler material comprising vitreous china. The article has a water absorption of less than approximately one percent.

Another exemplary embodiment relates to a method of making an article that includes mixing a filler material and a polymer matrix material to produce a composite material, introducing the composite material produced by the mixing into a mold of a desired shape, and removing an article having the desired shape from the mold. The resulting article has a water absorption of less than about one percent and the filler material comprises vitreous china.

DETAILED DESCRIPTION

An exemplary embodiment of the invention relates to a composite material incorporating an inorganic filler material, such as recycled vitreous china or sand, in a polymer matrix to provide a product that has a generally hard, non-porous surface. The composite material may be used to make members or structures such as lavatory sinks, kitchen sinks, countertops, integrated top and bowl sinks, shower receptors, shower surrounds, bathtubs, or other products for which a hard, non-porous surface characteristic would be desired.

Another exemplary embodiment of the invention relates to a method for providing a composite material incorporating an inorganic filler material, providing an original source of ceramic material to be used as filler, grinding the original source of material into particles, mixing the ceramic particles with a polymer resin matrix and molding the mixture into shapes.

According to an exemplary embodiment, a member or structure such as a lavatory sink, kitchen sink, countertop (or, for example, and integrated countertop and sink), shower receptor or base, bathtub, or the like is manufactured using a composite material comprising a polymeric substrate or matrix material (e.g., epoxy) and an inorganic filler material (e.g., recycled vitreous china or sand from sand cores used in molding processes) in the polymer matrix to provide a product that has a hard, generally non-porous surface characteristic. In some, but not all, exemplary embodiments, the material may have the appearance of natural stone (e.g., the material can be made to resemble a number of different natural stones traditionally utilized in manufacturing sinks or countertops (such as granite, marble, onyx, or travertine)).

According to an exemplary embodiment, the composite material utilizes reclaimed/recycled vitreous china typically used in sanitary ware such as toilets and lavatories. One advantageous feature of such materials is that, as compared to traditional ceramics or china products, vitreous china has a significantly lower porosity and water absorption level. For example, traditional ceramics may have a porosity level of between approximately 10 and 20 percent. In comparison, sanitary ware products made with vitreous china typically have much lower porosity rates, typically on the order of less than 1 percent. In sanitary ware products, this porosity may advantageously allow for high stain resistance and lower water absorption; these same properties may advantageously also allow composite materials made with reclaimed crushed or pulverized vitreous china to exhibit improved porosity and stain resistance as compared to other composite and natural stone products available today.

Vitreous ceramic media (e.g., vitreous china) is a ceramic material that may in some cases have been glazed with enamel. Vitreous ceramic media has a compact and uniform structure which is fired until substantially all of the open cells disappear. During the process of vitrification, the particles constituting the base material are melted into a glass phase during firing and the glass phase is fluidized at a high temperature, filing up gaps formed between unmelted particles. Vitreous china is typically a mixture of clay (e.g. kaolin clay) and other materials such as silica, zirconia, etc. Vitreous china is typically prepared by forming different objects from the material and then applying a powdered glass which then is heated to a temperature sufficient to vitrify the substrate and glass surface. The vitrification process results in a material having a relatively low water absorption, which in turn provides the material with relatively high stain resistance.

According to an exemplary embodiment, the composite material includes a polymer matrix and an inorganic filler material that is preferably repurposed or recycled from other applications (e.g., a vitreous china material previously used in sanitary ware manufacture or sand that has been recycled from spent sand used in molding operations). In such an embodiment, the filler material is introduced as reinforcement material into a polymer resin material. According to an exemplary embodiment, the composite material may include between approximately 10 and 70 percent polymer resin material by weight and between approximately 30 and 90 percent filler materials (e.g. vitreous china or sand), depending on the desired characteristics of the resulting composite material. The composite material may also include other fillers therein, such as fibrous strengthening materials in the form of carbon fiber, aramid fiber, polypropylene fiber, and the like, as well as other constituent ingredients at levels of between approximately 0 and 20 percent (e.g. pigment, catalyst, mold release, UV stabilizer, thickening agent, for controlling material shrinkage, for facilitating cross-linking, etc.), or other materials consistent with present disclosure as will be recognized by those skilled in the art. The polymer resin may be a single polymer resin material (e.g., urethane, epoxy, vinyl esters etc.) or may be a mixture or combination of more than one polymer resin material.

According to an exemplary embodiment, the inorganic filler material has a composition that comprises between approximately 10 and 30 weight percent kaolin clay, between approximately 20 and 40 weight percent ball clays, and between approximately 35 and 55 weight percent non-plastics. An exemplary embodiment of such a material may comprise between approximately 50 and 80 weight percent $SiO_2$, between approximately 10 and 30 weight percent $Al_2O_3$, between approximately 0 and 4 weight percent $Na_2O_3$, between approximately 0 and 4 weight percent $K_2O$, between approximately 0 and 3 weight percent $TiO_2$, and between approximately 0 and 5 weight percent MgO. According to other exemplary embodiments, the inorganic filler material may have different compositions. Any vitreous china material may be used according to a variety of other exemplary embodiments.

According to an exemplary embodiment, the inorganic filler material is a ceramic material. In one exemplary embodiment, the ceramic is vitreous china. In another exemplary embodiment, the ceramic is fire clay. The inorganic filler material may be made up of other materials consistent with the present disclosure as will be recognized by those skilled in the art. In some exemplary embodiments, the material may be reclaimed or recycled material that was used to form products such as toilets, bidets, sinks, and other sanitary ware (e.g., it may be excess material left over from the product manufacturing process and/or crushed or pulverized material formed by breaking up sanitary ware such as the aforementioned products). Such materials may have undergone a vitrification process to remove pores formed in the material.

In one exemplary embodiment, the inorganic filler material may be provided from previously processed materials. The previously processed material may be excess from a current production line (e.g., flash or other unused materials produced in a sanitary ware production line). The previously-processed material may be defective material that cannot be used in a different production line (e.g., materials for making toilets, sinks, bidets, etc.). In another exemplary embodiment, the inorganic filler material may be provided from current existing products, which are reclaimed and crushed or pulverized to create the inorganic filler material. These current existing products may have been manufactured using materials with properties that would be advantageous for use as inorganic filler materials (e.g., low water absorption, minimal porosity, high hardness). In one exemplary embodiment, the existing products utilized would be sanitary ware products. These existing products could come from different manufacturing lines in which excess products or defective products were produced (e.g., destroyed toilets, destroyed sinks, excess sinks, excess toilets, etc.).

The inorganic filler material may be processed using a crushing or pulverizing process to reduce the size of the particle sizes so as to be acceptable for use in the composite material described herein. For example, according to an exemplary embodiment, the original source of the inorganic filler material may be in the form of a slab or a block. According to another exemplary embodiment, the original source of the inorganic filler material may be in the form of a sanitary ware product such as a toilet, lavatory sink, bathtub or the like. These embodiments are representative of the sources of the inorganic filler material and are not intended to limit sources to just these examples provided. The original source of the inorganic filler material will be ground up to produce particles that can be introduced as a reinforcement material in a melted polymer resin matrix. The inorganic filler material may be ground up using milling machines, grinding wheels, or other types of grinding machines.

The original source of the inorganic filler material can be ground up, crushed, or pulverized to provide a range of desired particle sizes. The size range of particles can be controlled during the grinding process. The range of sizes needed, therefore, can be determined before the original source of material is ground up. The range of particle sizes could be a small or a large range depending on the type of product for which the filler will be used. According to an exemplary embodiment, the particle size of the filler ranges from about 1 to about 2,000 micrometers. In other embodiments the particle size of the filler ranges from about 1 to about 1,000 micrometers or from about 1 to about 400 micrometers. In an exemplary embodiment, the range of particle sizes may be varied to achieve different aesthetic qualities. In another exemplary embodiment, the range of particle sizes can be determined as to provide consistency in the composite material. In order to provide certain aesthetic quality or consistency, the range of filler particle sizes may, in an exemplary embodiment, have different specific ranges of particle size. In an exemplary embodiment, small particle sizes may be employed to enhance the suspension of the filler material in the polymer matrix. In another exemplary embodiment, large particle sizes may be employed to improve the hardness and scratch resistance of the composite material. In an exemplary embodiment, a mixture of particle sizes (e.g., a bimodal or multimodal size distribution) may be employed to provide increased packing efficiency in addition to improved hardness, scratch resistance and enhanced suspension of the filler material in the polymer matrix.

According to an exemplary embodiment, the inorganic filler material may be or include a sand material. The sand material may be beach sand or core sand recovered from a sand-casting process. In an exemplary embodiment, an original source of the inorganic filler material may be core sand that includes a binder material. The original source material may be treated to remove the binder material. In an exemplary embodiment, the original source material may be heat treated to burn off the binder material. In another embodiment, the original source material may be processed with a magnet to remove undesired magnetic contaminants. The sand particles provided in the original source material may have particle sizes and water absorption in the range appropriate for introduction to the polymer matrix material, as described previously.

According to another exemplary embodiment, the inorganic filler material may be a mixture of vitreous china and sand. In an exemplary embodiment, the inorganic filler may be approximately 50% vitreous china and approximately 50% sand by weight. Other mixture ratios may be employed where appropriate. According to other exemplary embodiments, the ratio may vary between 100% vitreous china to 100% sand, and anywhere therebetween. As with the particle distribution sizes, the percentage of vitreous china and sand can be adjusted to provide a desirable mixture providing a particular performance and/or aesthetic for the finished product.

Once the inorganic filler material has been ground into particles, the filler material can be introduced into a polymer matrix. In an exemplary embodiment, the polymer matrix will be an epoxy material. After the mixing of the filler material and polymer matrix, the mixture can be molded into different shapes. In one exemplary embodiment, the mixture can be molded into a kitchen sink. In another exemplary embodiment, the mixture can be molded into a lavatory sink. In another exemplary embodiment, the mixture can be molded into a countertop. In another exemplary embodiment, the mixture can be molded into an integrated top and bowl single structure (e.g., an assembly that includes both a countertop and a sink bowl in one integrally formed unit). In yet another exemplary embodiment, the mixture can be molded into a shower receptor. In another exemplary embodiment, the mixture can be molded into a bathtub. Molds used in different productions lines (e.g. sink production lines, countertop production lines, shower receptor production lines, bathtub production lines) can be used in molding the mixture into shapes.

According to another exemplary embodiment, a ground or crushed glass material, such as silicon dioxide ($SiO_2$), based material may be introduced into the polymer matrix in addition to the inorganic filler material. For example, glass reclaimed from recycled shower doors, windows, and other sources may be crushed to produce fine particles. One advantageous feature of using such a glass material in addition to the vitreous china is that the glass material may assist in keeping the vitreous china particles in suspension. According to an exemplary embodiment, the composite material may include a filler that is approximately 90 weight percent vitreous china and 10 weight percent glass, although these proportions may be varied according to other exemplary embodiments depending on the desired characteristics of the resulting composite material. This vitreous china and glass filler material may be used in addition to other filler materials as described herein, such as fibrous strengthening materials in the form of carbon fiber, aramid fiber, polypropylene fiber, and the like, as well as other constituent ingredients of approximately 0-20 percent (e.g. pigment, catalyst, mold release, UV stabilizer, thickening agent, for controlling material shrinkage, for facilitating cross-linking, etc.), or other materials consistent with present disclosure as will be recognized by those skilled in the art. Again, the polymer resin may be a single polymer resin material (e.g., urethane, epoxy, vinyl esters etc.) or may be a mixture or combination of more than one polymer resin material.

According to an exemplary embodiment, the filler and the overall composite material each have a water absorption of less than about 1 percent (e.g., calculated by weighing the composite material before and after submersion in water to determine the weight percent of water within the composite material after submersion). The water absorption of the material may depend on the water absorption of the filler material used. The water absorption can be varied depending on the application for which the product is intended. The water absorption is varied by using filler materials with different water absorption values. The water absorption of the material will depend on what preparation processes the original source material goes through before it is used as a filler material. In some exemplary embodiments, the inorganic filler material may have undergone the vitrification process which will significantly reduce the size of the pores in the inorganic filler material. Kitchen applications such as countertops require material with low water absorptions. The countertops will likely come into contact with food or liquids which can permanently stain countertops made from porous materials. Composite material with a very low water absorption can be used in these kitchen applications to greatly reduce staining that may occur from day-to-day use. Bathroom applications such as lavatory sinks also require material with low water absorptions. The sinks will likely come into contact with household products and chemicals (such as toothpaste, hand soap etc.) which can permanently stain sinks made from porous materials. Composite materials with very low water absorptions can be used in bathroom applications to greatly reduce staining that may occur from day-to-day use.

According to an exemplary embodiment, the hardness of the composite material will range from 4 to 9 on the Moh's hardness scale. The hardness of the material may be comparable to the hardness ratings of natural stone products commonly used in kitchen and lavatory applications. For example, granite, which is typically used for countertops, has a hardness of 7 on the Moh's hardness scale, whereas marble, which is typically used for sinks, has a hardness of 3 on the Moh's hardness scale. The hardness of the composite material can be varied depending on the application for which the material will be used. Kitchen applications require material with high abrasion resistance. High abrasion resistance requires a hard material to be used in manufacturing the kitchen applications. The ceramic material used as filler is an inherently hard material, making it well suited for kitchen applications. The hardness of the material can be adjusted by altering the composition of the material (e.g., increasing the percentage of the ceramic filler). The hardness of the material can also be adjusted by the use of additives in the composite. Additives such as alumina may also be used to increase the hardness of the material.

According to an exemplary embodiment, the impact resistance and strength of the composite material and products produced therefrom will exhibit an improvement of at least about 25% when compared to similar composite materials. In an exemplary embodiment, the composite material such that it will survive an impact from a five pound dart dropped from a height of at least approximately 36 inches.

According to an exemplary embodiment, the resulting product may be any of a variety of colors. For example, the composite material may have a matte black or matte brown appearance, or may have other colors or combinations of colors according to other exemplary embodiments.

According to an exemplary embodiment, the particles of the inorganic filler material in the substrate material can subjected to a coloring process prior to introduction into the polymer matrix. One advantageous feature of coloring the particles is that ceramic material from a variety of sources may be used in the composite material despite their initial variations in colors. For example, sinks in a variety of colors or shades may be broken down to form the particles, and all of the particles may be colored using the same colorant to obtain a consistent color for the particles. According to other exemplary embodiments, particles having a variety of colors may be used to provide the composite materials with a desired color aesthetic (e.g., the composite may use white, green, and blue particles within a matrix to provide a multi-colored surface appearance).

The colorants can be applied to the ceramic particles so that a chemical bond is formed, which may advantageously reduce or prevent the color from fading or leaching, and may also allow a more consistent look for the particles included in the composite. Additionally, the chemical bonding of the colorant to the ceramic particles allows the composite material to maintain color on its surface. In other exemplary embodiments, the particles can be colored using one or more of dry temper colors, dry mortar, dyes, pigments, paint, or other materials consistent with present disclosure as will be recognized by those skilled in the art. In an exemplary embodiment, the particles can be substantially coated using the colorant to provide consistency. According to other exemplary embodiments, the particles can be substantially coated using the colorant to provide a desired aesthetic effect. Different colorants can be applied to different positions of the particles to achieve varying colors or effects. Colorants can be applied to the ceramic particles to provide a material that resembles natural stone. In other exemplary embodiments, different colorants can be applied to the particles so that it matches the exterior color of the member or structure (e.g., lavatory sink, kitchen sink). The colorant matching the exterior of the member or structure can greatly decrease the perception of any scratches or imperfections of the member or structure.

According to an exemplary embodiment, the ceramic particles can be mixed with additives. The additives can include one or more of wood ash, mica, stone particles, glass particles, or other materials consistent with the present disclosure as will be recognized by those skilled in the art. In one exemplary embodiment, the additives can be mixed with the particles to provide consistency. In another exemplary embodiment, the additives can be mixed with the particles to provide a desired aesthetic effect. A combination of additives can be mixed with the particles to provide a desired aesthetic effect. Different additives can be mixed with different portions of the particles to achieve varying colors or effects.

Figure 1:
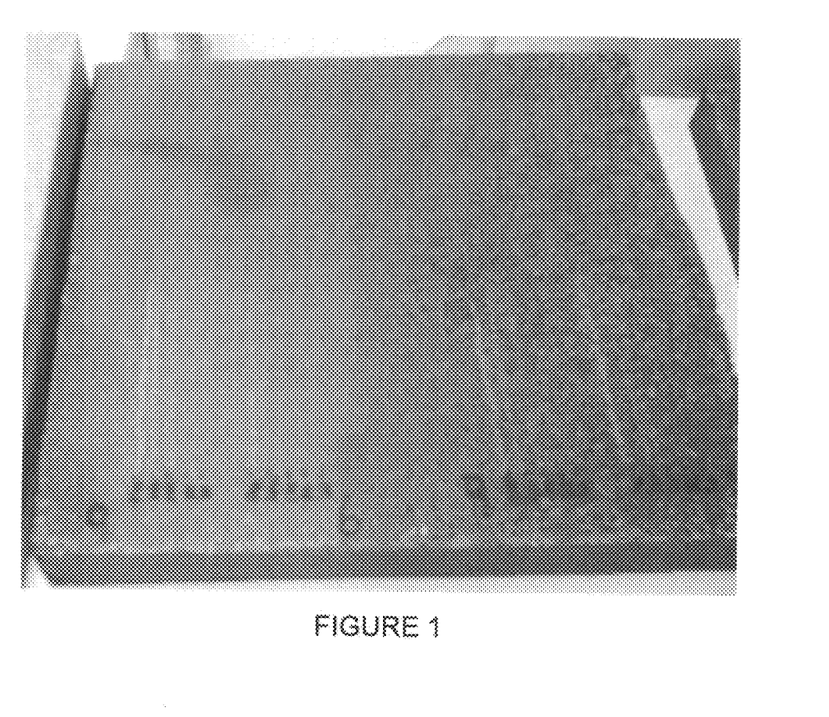
FIG. 1 is a photograph illustrating a sample of a composite material produced according to an exemplary embodiment.
Figure 2:
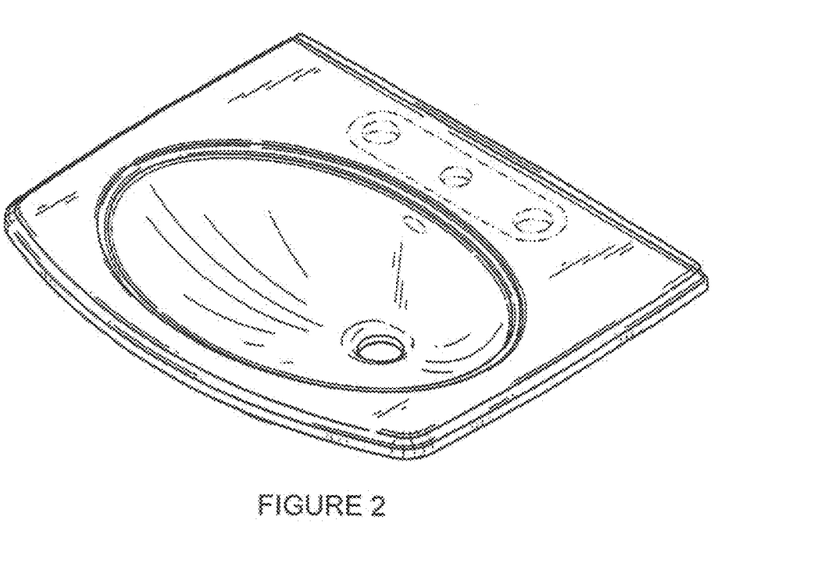
FIGS. 2-8 illustrate various sink designs that may be produced using the composite material described herein according to various other exemplary embodiments.
Figure 3:
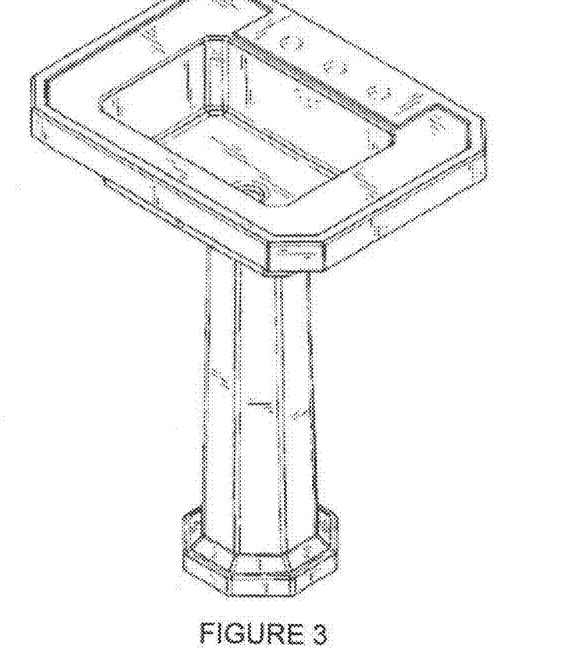
Figure 4:
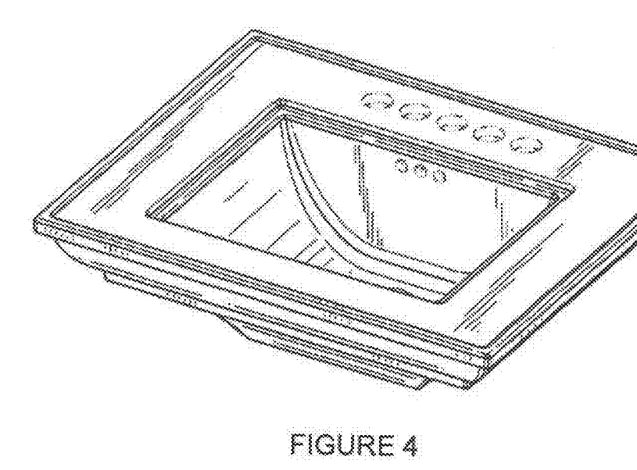
Figure 5:
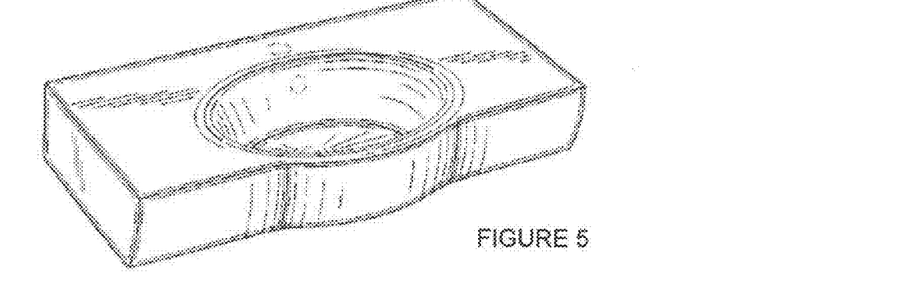
Figure 6:
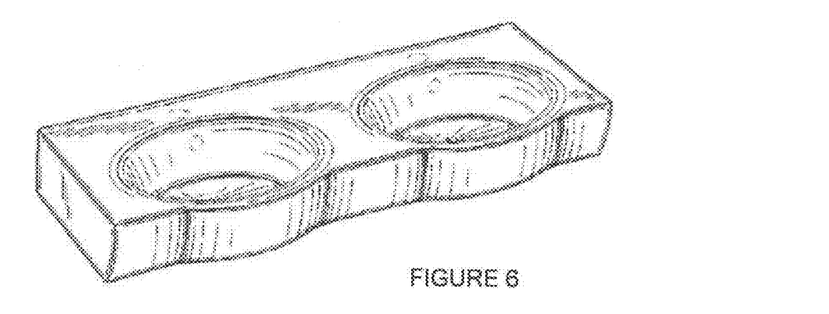
Figure 7:
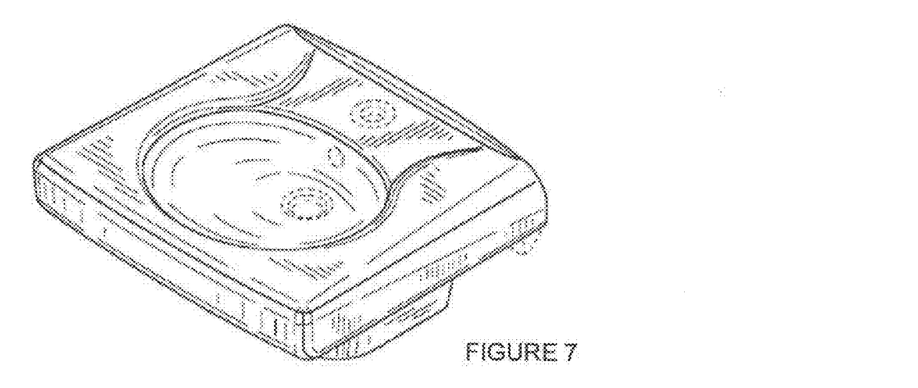
Figure 8:
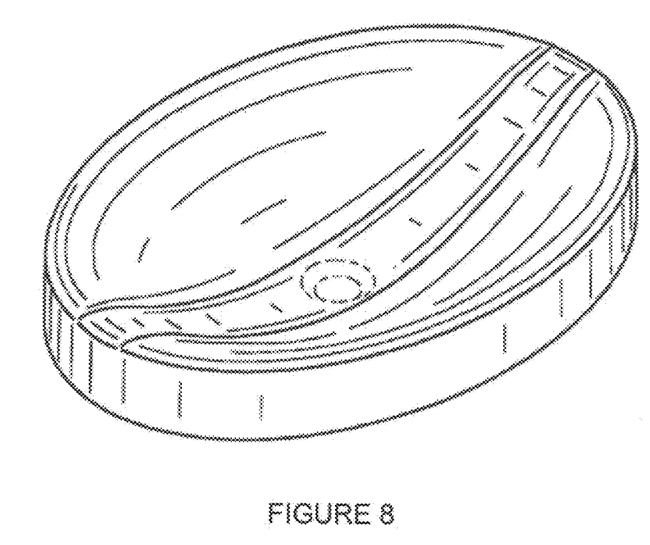

Turning now to the accompanying drawing figures, FIG. 1 illustrates a sample made of a composite material comprising an epoxy matrix and a vitreous china filler according to an exemplary embodiment. As illustrated, the sample has a dark stone-like appearance. The color of the sample may differ depending to various other exemplary embodiments depending on the type of colorant used with the particles and/or polymer matrix material.

FIGS. 2-8 illustrate a number of possible sink designs that may be formed using the composite materials described herein. These sink designs are intended as illustrative and are in no way intended to be limiting. According to other exemplary embodiments, any of a variety of different sink designs may be created using such composite materials. According to still other exemplary embodiments, the composite material may be used to form countertops, integrated sink and countertop products, bathtubs, shower stalls and surrounds, and any of a variety of other types of products for which an engineered stone-like surface may be desired.

Figure 9:
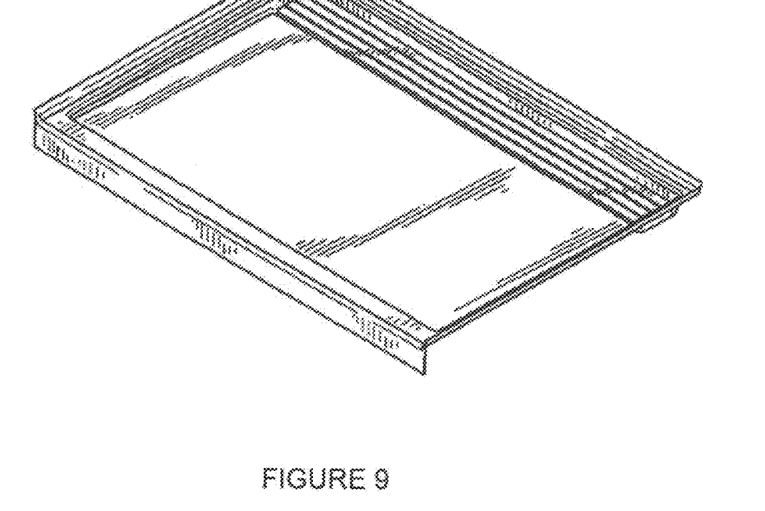
FIGS. 9 and 10 illustrate various shower receptor designs that may be produced using the composite material described herein according to various other exemplary embodiments.
Figure 10:
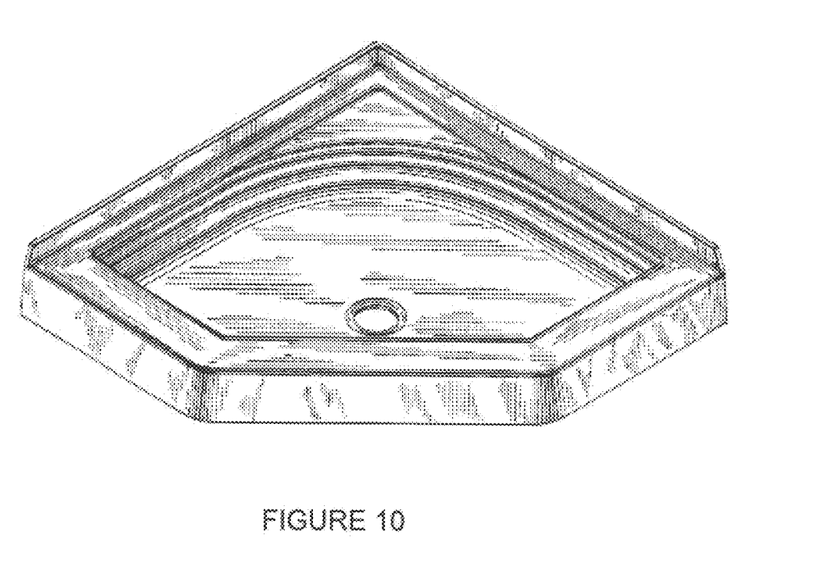

FIGS. 9 and 10 illustrate a pair of possible shower receptor designs that may be formed using the composite materials described herein. These shower receptor designs are intended as illustrative and are in no way intended to be limiting. According to other exemplary embodiments, any of a variety of different shower receptor designs may be created using such composite materials.

Figure 11:
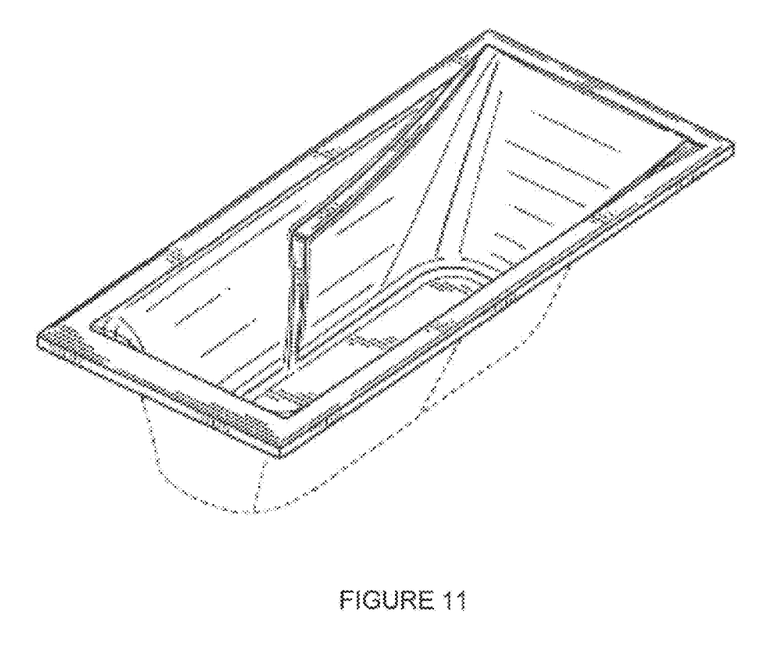
FIGS. 11 and 12 illustrate various bathtub designs that may be produced using the composite material described herein according to various other exemplary embodiments.
Figure 12:
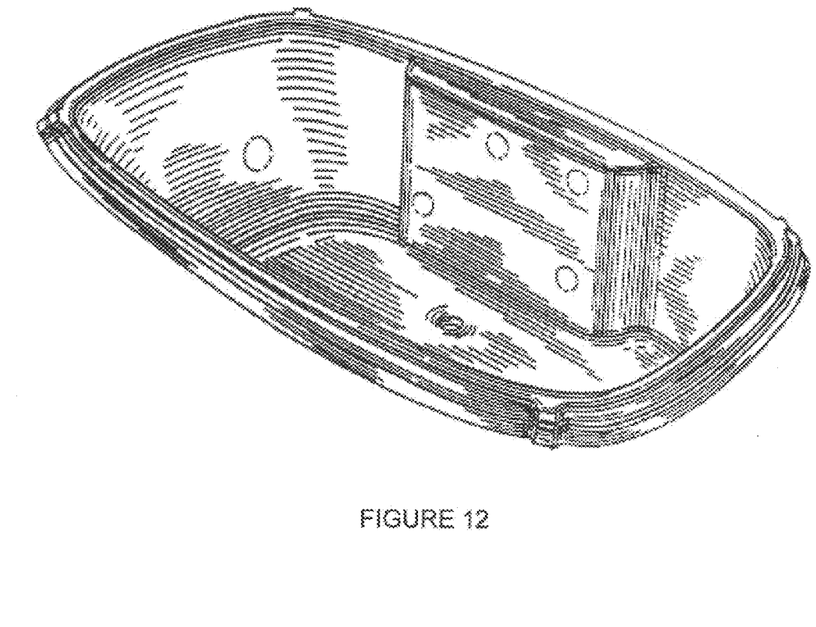

FIGS. 11 and 12 illustrate a pair of possible bathtub designs that may be formed using the composite materials described herein. These bathtub designs are intended as illustrative and are in no way intended to be limiting. According to other exemplary embodiments, any of a variety of different bathtub designs may be created using such composite materials.

Figure 13:
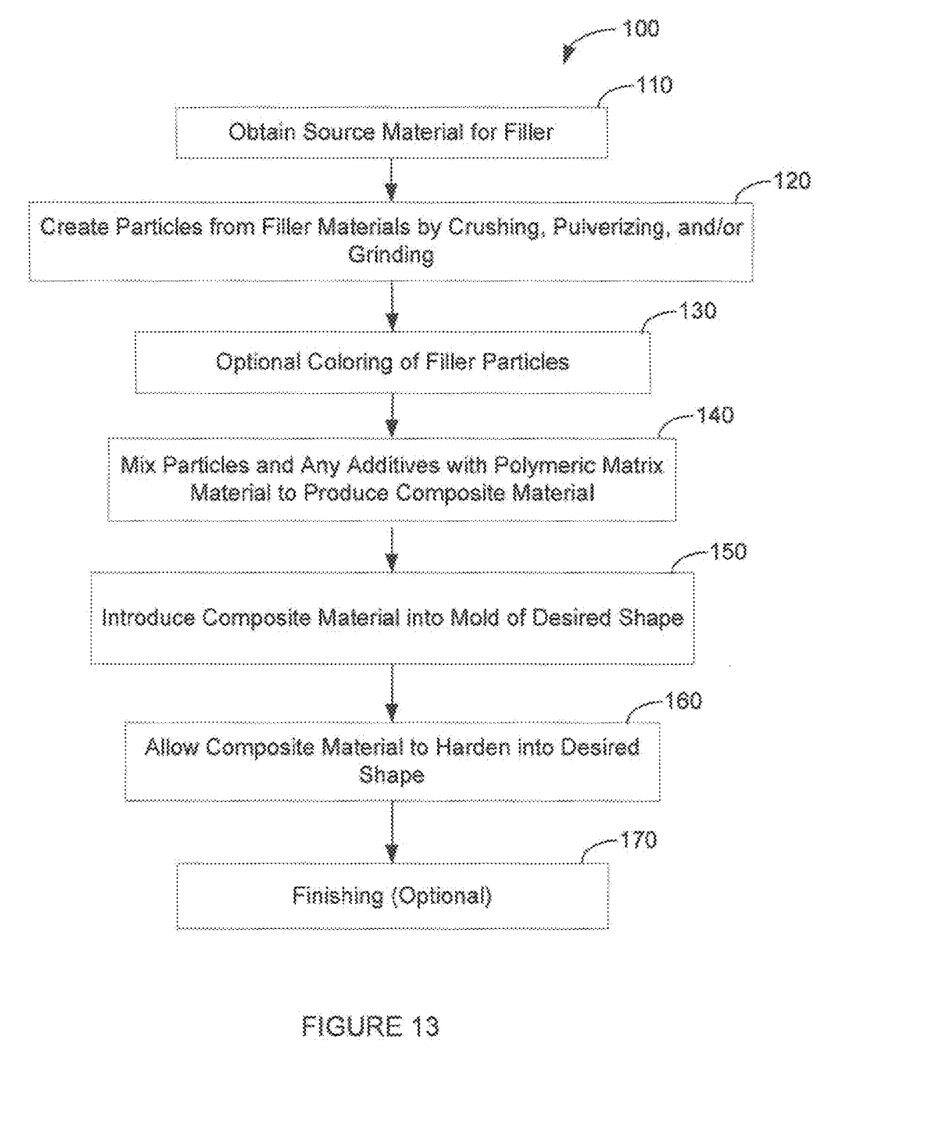
FIG. 13 is a flow chart detailing the steps of the manufacturing process to make a composite material according to an exemplary embodiment.

FIG. 13 is a flowchart illustrating a process 100 for producing a composite material and a product therefrom according to an exemplary embodiment.

In a step 110, a source of the ceramic filler material is obtained. For example, the source may be existing sanitary ware products such as sinks, toilets, and the like. In another example, the source may be excess material from the production of sanitary ware or other types of products. The source material is preferably a vitrified china material that has a composition and water absorption as described herein.

In a step 120, the source material is processed to produce particles having the desired size and/or shape characteristics for use in the composite material. According to various other exemplary embodiments, the source material may be subjected to crushing, pulverizing, and/or grinding operations to reduce the size of the particles and to obtain a desired particle size distribution. Such operations may be performed using any suitable equipment, whether now known or later developed. It should be noted that while the process 100 contemplates that this processing step may be performed in conjunction with the manufacturing process, according to other exemplary embodiments, pre-processed particles may be obtained from a third-party source such as a materials supplier (i.e., the end producer of the product need not crush the source material for the filler, but may instead obtain that material from a supplier; the supplier may also color the particles prior to delivering them if desired).

In an optional step 130, the processed particles may be colored as described herein. According to one exemplary embodiment, all particles used in the product may have the same color, while according to other exemplary embodiments, a variety of colors may be utilized. In an exemplary embodiment, particles of substantially similar color (e.g., white, almond, biscuit, etc.) may be utilized. As will be understood by those reviewing this disclosure, the polymer used for the matrix (e.g., an epoxy) may also be colored either to match or to contrast or complement the particles to be used in the product. In an exemplary embodiment, the polymer used for the matrix may be opaque and coat the particles such that the particles appear to have a uniform color.

In a step 140, the particles and any additives are added to a polymeric resin material using any acceptable method. The particles may be added concurrently with the other additives or the constituents to be added may be added in a staged fashion according to any desired processing order. Optional coloring of the polymeric matrix material may be accomplished in this step or may be performed prior to or after the addition of the particles and/or additive materials.

The composite material formed in step 140 may then be added into a mold having a desired shape to produce the end product in a step 150. The introduction into the mold may be accomplished by any desired method, and any of a variety of mold designs, shapes, and/or sizes may be used according to various exemplary embodiments.

After introducing the composite material into the mold, the composite material is allowed to harden in a step 160 to form the product. After the product is removed from the mold, optional post-molding finishing processes may be performed in a step 170, and may include, for example, applying protective coatings to the resultant product, polishing, removing flash or other undesirable components of the product, and the like. In an exemplary embodiment, post-molding finishing step 170 may be a heat treatment step including holding the molded product at a temperature of between approximately 250° F. and 350° F. for a time period of between approximately 1 and 3 hours. In another exemplary embodiment, post-molding finishing step 170 may be a heat treatment step including holding the molded product at a temperature of approximately 300° F. for a time period of approximately 2 hours. Post-molding heat treatment may beneficially allow cross-linking of the polymer chains and complete hardening of the product.

Figure 14:
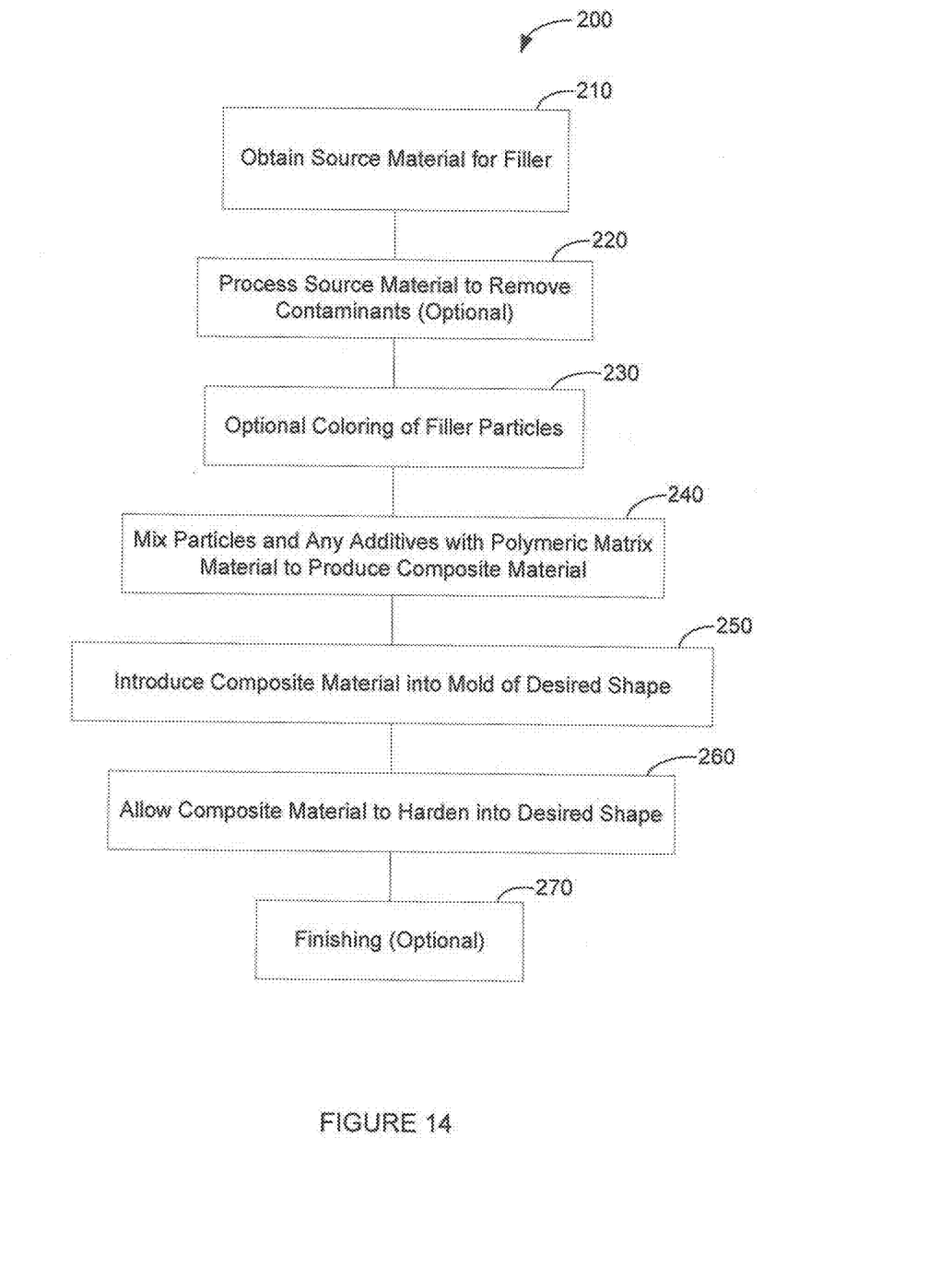
FIG. 14 is a flow chart detailing the steps of the manufacturing process to make a composite material according to an exemplary embodiment.

FIG. 14 is a flowchart illustrating a process 200 for producing a composite material and a product therefrom according to another exemplary embodiment.

In a step 210, a source of the inorganic filler material is obtained. For example, the source may be beach sand, core sand recovered from a sand-casting process, and the like. The source material is preferably a core sand material that has a composition and water absorption as described herein.

In an optional step 220, the source material may be processed to remove contaminants. In an exemplary embodiment, a binder may be removed from the source material, such as by heat treatment, to produce a binder free filler material. In another embodiment, magnetic contaminants may be removed, such as by magnetic separation. Such operations may be performed using any suitable equipment, whether now known or later developed. It should be noted that while the process 200 contemplates that this processing step may be performed in conjunction with the manufacturing process, according to other exemplary embodiments, pre-processed particles may be obtained from a third-party source such as a materials supplier (i.e., the end producer of the product need not remove the binder from the source material, but may instead obtain that material from a supplier; the supplier may also color the particles prior to delivering them if desired).

In an optional step 230, the processed particles may be colored as described herein. According to one exemplary embodiment, all particles used in the product may have the same color, while according to other exemplary embodiments, a variety of colors may be utilized. In an exemplary embodiment, particles of substantially similar color (e.g., white, almond, biscuit, etc.) may be utilized. As will be understood by those reviewing this disclosure, the polymer used for the matrix (e.g., an epoxy) may also be colored either to match or to contrast or complement the particles to be used in the product. In an exemplary embodiment, the polymer used for the matrix may be opaque and coat the particles such that the particles appear to have a uniform color.

In a step 240, the particles and any additives are added to a polymeric resin material using any acceptable method. The particles may be added concurrently with the other additives or the constituents to be added may be added in a staged fashion according to any desired processing order. Optional coloring of the polymeric matrix material may be accomplished in this step or may be performed prior to or after the addition of the particles and/or additive materials.

The composite material formed in step 240 may then be added into a mold having a desired shape to produce the end product in a step 250. The introduction into the mold may be accomplished by any desired method, and any of a variety of mold designs, shapes, and/or sizes may be used according to various exemplary embodiments.

After introducing the composite material into the mold, the composite material is allowed to harden in a step 260 to form the product. After the product is removed from the mold, optional post-molding finishing processes may be performed in a step 270, and may include, for example, applying protective coatings to the resultant product, polishing, removing flash or other undesirable components of the product, and the like. In an exemplary embodiment, post-molding finishing step 270 may be a heat treatment step including holding the molded product at a temperature of between approximately 250° F. and 350° F. for a time period of between approximately 1 and 3 hours. In another exemplary embodiment, post-molding finishing step 270 may be a heat treatment step including holding the molded product at a temperature of approximately 300° F. for a time period of approximately 2 hours. Post-molding heat treatment may beneficially allow cross-linking of the polymer chains and complete hardening of the product.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A composite material comprising:
   a polymer matrix material; and
   a filler material comprising vitreous china;
   wherein the composite material has a water absorption of less than about one percent.

2. The composite material of claim 1, wherein the filler material comprises particles with a size in the range of between approximately 1 and 2000 micrometers.

3. The composite material of claim 1, wherein the composite material comprises between about 10% and 70% by weight polymer matrix material and between about 30% and 90% by weight filler material.

4. The composite material of claim 1, wherein the filler material further comprises sand.

5. The composite material of claim 4, wherein the sand is recycled core sand.

6. The composite material of claim 1, wherein the polymer matrix material comprises a polymer resin material or a mixture of polymer resin materials.

7. The composite material of claim 1, wherein the vitreous china comprises:
   between about 50% and 80% by weight $SiO_2$,
   between about 10% and 30% by weight $Al_2O_3$,
   between about 0% and 4% by weight $Na_2O_3$,
   between about 0% and 4% by weight $K_2O$,
   between about 0% and 3% by weight $TiO_2$, and
   between about 0% and 5% by weight $MgO$.

8. The composite material of claim 1, wherein the composite material has a hardness of between about 4 and 9 on the Moh's hardness scale.

9. The composite material of claim 1, wherein the filler material has a water absorption of less than about 1%.

10. An article comprising a composition, the composition comprising:
    a polymer matrix material; and
    a filler material comprising vitreous china;
    wherein the article has a water absorption of less than approximately one percent.

11. The article of claim 10, wherein the article is a sink.

12. The article of claim 10, wherein the article is a shower receptor, bathtub, countertop, or integrated top and bowl single structure.

13. The article of claim 10, wherein the filler material comprises particles with a size in the range of about 1 to about 2000 micrometers.

14. The article of claim 10, wherein the composition comprises between about 10% and 70% by weight polymer matrix material and between about 30% and 90% by weight filler material.

15. The article of claim 10, wherein the filler material comprises sand.

16. The article of claim 15, wherein the sand is recycled core sand.

17. The article of claim 10, wherein the polymer matrix material comprises a polymer resin material or a mixture of polymer resin materials.

18. The article of claim 10, wherein the vitreous china comprises:
    between about 50% and 80% by weight $SiO_2$,
    between about 10% and 30% by weight $Al_2O_3$,
    between about 0% and 4% by weight $Na_2O_3$,
    between about 0% and 4% by weight $K_2O$,
    between about 0% and 3% by weight $TiO_2$, and
    between about 0% and 5% by weight $MgO$.

19. The article of claim 10, wherein the article has a hardness of between about 4 and 9 on the Moh's hardness scale.

20. The article of claim 10, wherein the filler material has a water absorption of less than 1%.

* * * * *